(12) United States Patent
Scott et al.

(10) Patent No.: US 7,750,976 B2
(45) Date of Patent: Jul. 6, 2010

(54) AUTOMATIC VIDEO DETECTOR

(75) Inventors: Harvard L. Scott, San Diego, CA (US); John E. Welch, Encinitas, CA (US); Peter M. Murdock, San Diego, CA (US); Chris J. Delgrande, Carlsbad, CA (US)

(73) Assignee: Conexant Systems, Inc., Newport Beach, CA (US)

( * ) Notice: Subject to any disclaimer, the term of this patent is extended or adjusted under 35 U.S.C. 154(b) by 1222 days.

(21) Appl. No.: 11/323,337

(22) Filed: Dec. 30, 2005

(65) Prior Publication Data

US 2006/0170776 A1    Aug. 3, 2006

Related U.S. Application Data

(60) Provisional application No. 60/641,044, filed on Dec. 30, 2004.

(51) Int. Cl.
*H04N 5/45* (2006.01)
(52) U.S. Cl. ...................................................... 348/558
(58) Field of Classification Search ................. 375/295, 375/341; 348/700–702, 441
See application file for complete search history.

(56) References Cited

U.S. PATENT DOCUMENTS

| | | | |
|---|---|---|---|
| 4,982,280 A * | 1/1991 | Lyon et al. ................... | 348/448 |
| 5,136,369 A | 8/1992 | Bohme et al. | |
| 5,835,157 A | 11/1998 | Miyazaki et al. | |
| 6,160,589 A * | 12/2000 | Sadowski ................... | 348/526 |
| 6,580,463 B2 * | 6/2003 | Swartz ....................... | 348/558 |
| 7,027,102 B2 * | 4/2006 | Sacca ......................... | 348/572 |
| 7,212,498 B2 * | 5/2007 | Austin et al. ................. | 370/252 |
| 7,277,496 B2 * | 10/2007 | Smolyar et al. ............. | 375/295 |
| 7,382,744 B2 * | 6/2008 | Bhushan et al. ............. | 370/328 |
| 7,440,677 B2 * | 10/2008 | Strasser ....................... | 386/94 |
| 7,515,211 B2 * | 4/2009 | Asamura et al. ............ | 348/663 |
| 2003/0001967 A1 | 1/2003 | Usui | |
| 2004/0008644 A1 * | 1/2004 | Holtzman et al. ........... | 370/329 |

FOREIGN PATENT DOCUMENTS

| | | |
|---|---|---|
| EP | 0529442 | 3/1993 |
| EP | 1209910 | 5/2002 |
| JP | 61039692 | 2/1986 |

* cited by examiner

*Primary Examiner*—Paulos M Natnael
(74) *Attorney, Agent, or Firm*—Jackson Walker L.L.P.; Christopher J. Rourk (57) ABSTRACT

An automatic Video Detector ("AVD") for detecting the transmission format of a received video signal is disclosed. The AVD may include a video detector array module and a state machine. The video detector array module may include a video line detector and a sub-carrier frequency detection module in signal communication with the video line detector.

8 Claims, 10 Drawing Sheets

AUTOMATIC VIDEO DETECTOR

REFERENCE TO EARLIER-FILED APPLICATION

This application claims priority under Title 35, United States Code Section 119(e), to U.S. Provisional Application Ser. No. 60/641,044 titled "Automatic Video Detector," filed Dec. 30, 2004, which is incorporated herein, in its entirety, by this reference.

BACKGROUND OF THE INVENTION

1. Field of Invention

This invention relates to video transmission format conversion systems, and in particular to an automatic video detector for automatically detecting the transmission format of a broadcast video signal.

2. Related Art

At present, television systems across the world are different and the world is divided into three television transmission format standards that are basically incompatible: NTSC, PAL, and SECAM. Of these three formats, the two most popular transmission formats are NTSC ("National Television System Committee"), utilized in the United States, Canada, Mexico, parts of Central and South America, Japan, Taiwan, and Korea and the world dominant PAL ("Phase Alternating Line") transmission format, used in most of Western Europe (except for France), China, India, most of Africa, and most of the Middle East. The third transmission format SECAM ("Sequential Couleur Avec Memoire" or in English "Sequential Color with Memory") is a French based transmission format that is generally used in France, Russia, Eastern Europe, and some parts of the Middle East.

The NTSC transmission format is based on a 525 line, 59.94 fields/29.97 frames-per-second at 59.94 Hz system for transmission and display of video images. NTSC is an interlaced system in which each frame is scanned in two fields of 262.5 lines per field, which is then combined to display a frame of video with 525 scan lines. The PAL transmission format is based on a 625 line, 50 field/25 frames a second, 50 HZ system. The PAL signal is interlaced, like NTSC, into two fields having 312.5 lines per field each. Similarly, SECAM is a 625 line, 50 field/25 frames per second interlaced system, but the color component is implemented differently than either PAL or NTSC. Generally, SECAM uses the same bandwidth as PAL does, but transmits the color information sequentially.

Generally, NTSC, PAL, and SECAM transmission formats are incompatible because each transmission format is based on different frame rates and color transmission formats. Additionally, there are numerous variations to NTSC, PAL, and SECAM transmission formats such as, for example, NTSC-M, NTSC-J, NTSC-4.43, PAL-B, PAL-D, PAL-G, PAL-H, PAL-I, PAL-M, PAL-N, and PAL-Nc, SECAM, ME-SE-CAM, and D-SECAM. These various transmission formats cause incompatibility issues with many video display and recording systems because video display and recording systems (such as a televisions, video recorders, and computers with built-in television tuners) from one part of the world generally will not function properly in another part of the world. These incompatibility issues become more pronounced at border nations such as, for example, Germany, Italy, Switzerland, Belgium, Spain and France, where France utilizes SECAM and the other border nations utilize PAL.

Attempted solutions to receiving these conflicting transmission formats have included producing "multi-system capable" (i.e., systems capable of receiving multiple transmission formats) devices such as video display and recording systems with multi-system capabilities. However, at present, many multi-system capable devices do not have the capability to automatically detect the received transmission format and configure the system without external information from either a manufacturer or an end-user or in a way that quickly determines the transmission format of the received signal.

At present, multi-system capable devices are only able to determine whether an input signal is either a 525-line or a 625-line format transmission without distinguishing whether the input signal is one of approximately 11 major transmission formats such as, for example, NTSC, NTSC-J, PAL-B, PAL-D, PAL-G, PAL-H, PAL-I, PAL-M, PAL-N, and PAL-Nc, or SECAM. As a result, end-users need to specify which first transmission format to assume if the multi-system capable device detects an input signal with 525-line format, and which second transmission format to assume if the multi-system capable device detects another input signal with 625-line format. These solutions are less flexible across different regions, especially in Europe where it is important to separate between PAL and SECAM. Therefore, there is a need for a system and method capable of automatically detecting the transmission format of broadcast video signals without external information.

SUMMARY

An automatic Video Detector ("AVD") for detecting the transmission format of a received video signal is disclosed. The AVD may include a video detector array module and a state machine. The video detector array module may include a video line detector and a sub-carrier frequency detection module in signal communication with the video line detector.

In an example of operation, the AVD may detect at least two transmission parameters of the plurality of transmission parameters of the received video signal and decode the transmission metrics to determine the transmission format of the received video signal.

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE DRAWINGS

The invention can be better understood with reference to the following figures. The components in the figures are not necessarily to scale, emphasis instead being placed upon illustrating the principles of the invention. In the figures, like reference numerals designate corresponding parts throughout the different views.

DETAILED DESCRIPTION

In the following description of the preferred and various alternative embodiments, reference is made to the accompanying drawings that form a part hereof, and in which is shown by way of illustration a specific embodiment in which the invention may be practiced. It is to be understood that other embodiments may be utilized and structural changes may be made without departing from the spirit and scope of this invention.

The invention is described with reference to various functional block diagrams, which illustrate possible applications of and embodiments of the invention from a functional perspective. These functional block diagrams should not be interpreted to imply or otherwise require a particular physical architecture in accordance with the partitioning of the functionality depicted therein. Instead, it will be appreciated by one of ordinary skill in the art that various alternative physical architectures (whether hardware, software or a combination thereof) can be used to implement the described functionality. For example, the invention can be implemented using various hardware and software components, including, for example, using a semiconductor integrated circuit (e.g., a chip) or a combination of semiconductor integrated circuits (e.g., a chipset or multi-chip module), or in associated circuitry, or in the software, firmware, protocol stacks, libraries, algorithms or other processes operating thereon (or in any configuration of one or more of the foregoing). The chip or chipset implementation may include an integrated circuit, including, for example, any of the following alone or in combination: an application specific integrated circuit ("ASIC"), a digital signal processor ("DSP"), or another general-purpose or specific-purpose processor, and associated circuitry (e.g., memory, co-processors, busses, etc.).

Disclosed is an Automatic Video Detector ("AVD") within a multi-format video device ("MVD") capable of detecting the transmission format of a received input video signal at the AVD and automatically configuring the MVD in response to the detection. Generally, the AVD utilizes at least two metrics measured from the received input video signal to distinguish between various possible transmission formats. The metrics may include, as an example, the number-of-lines-per-frame, the color sub-carrier frequency, the sub-carrier phase-alternation, and other metrics capable of identifying the transmission format of the received input video signal.

Once the at least two metrics are measured, the measured metric values are passed to a state machine that decodes these metrics by monitoring the detection of these metrics and determines the selected transmission format to use with the received input video signal. The state machine is capable of selecting and switching between multiple states of operation where each state corresponds to the transmission formats supported by the MVD. Once a state is selected by the state machine, the state machine passes the information to a control logic module that is capable of configuring the MVD to operate in a transmission format that corresponds to the received input video signal. In general, the state machine only switches between selected transmission formats when the measured metric values are stable, so that the selection of a transmission format is not triggered by noise or interference in the received input video signal. FIGS. 1-9 show examples of architectural implementations of the AVD in accordance with the invention.

Figure 1:
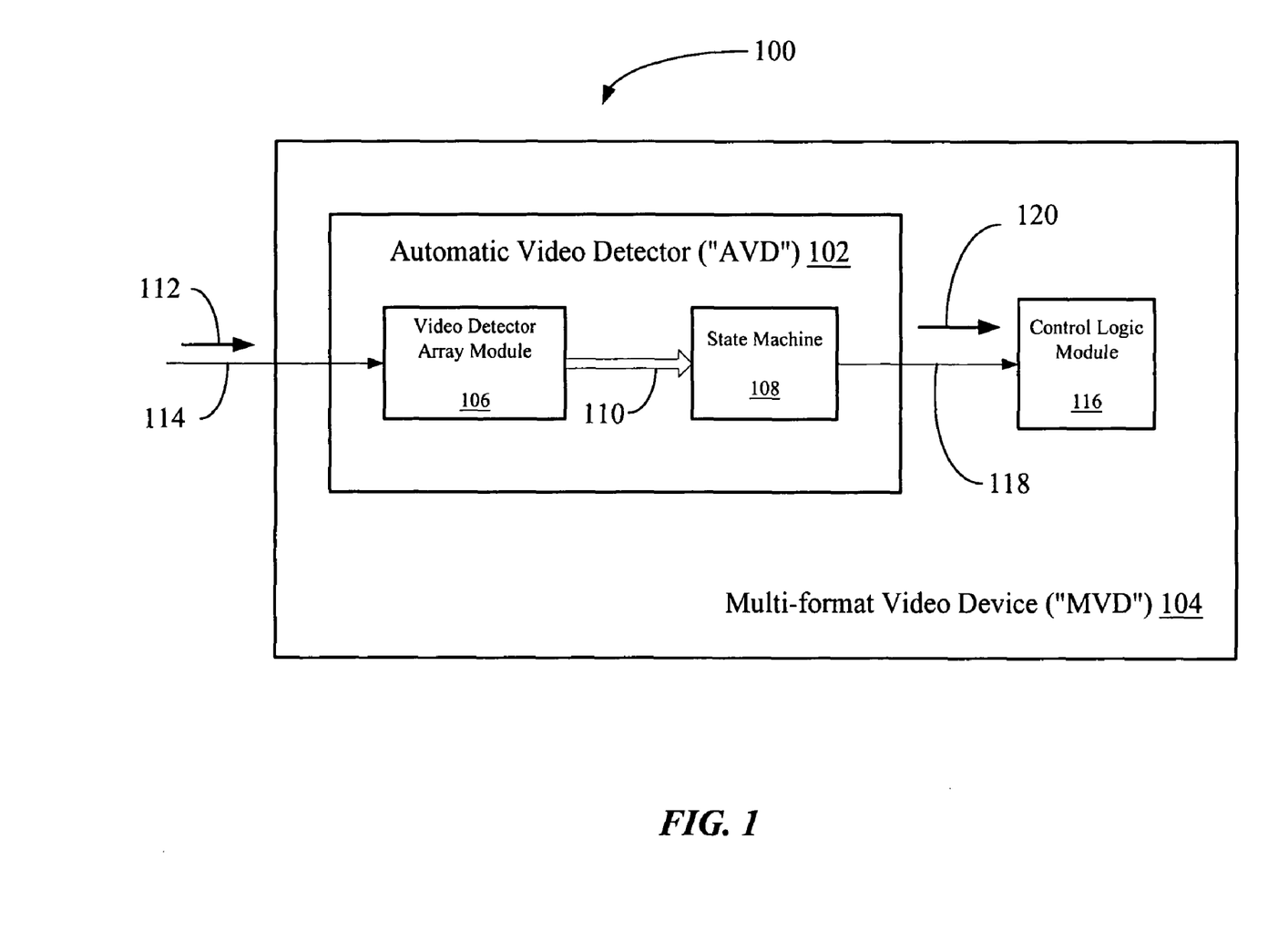
FIG. 1 is a functional block diagram of an example of an implementation of an Automatic Video Detector ("AVD").

In FIG. 1, a functional block diagram 100 of an example of an implementation of an AVD 102 within a MVD 104 is shown. The AVD 102 may include a video detector array module 106 and a state machine 108 in signal communication via signal path 110. The video detector array module 106 may receive a received input video signal 112 via signal path 114. The state machine 108 may also be in signal communication with a control logic module 116 via signal path 118.

In an example of operation, the AVD 102 may receive the received input video signal 112 at the video detector array module 106 via signal path 114. The received input video signal 112 may be an NTSC, PAL, or SECAM transmission formatted video signal having a plurality of metrics that may include the number-of-lines-per-frame, the color sub-carrier frequency, and the phase-alternation, etc. The video detector array module 106 may include a plurality of detector sub-modules capable of detecting and measuring the various metrics.

The state machine 108 may monitor the detection of these metrics via signal path 110 (which may be a signal bus having multiple signal sub-paths). Once at least two metrics are measured by the video detector array module 106, the measured metric values are passed to the state machine 108, via signal path 110, where the state machine 108 determines a transmission format to use with the received input video signal 112. The state machine 108 is capable of selecting and switching between multiple states of operation where each state corresponds to the transmission formats supported by the AVD 102. The state machine 108 then produces a control signal 120 and passes it to the control logic module 116, via signal path 118, where the control signal 120 includes information that corresponds to the selected state of the state machine 108. The control logic module 116 is capable of configuring the MVD 104 to operate in a transmission format that corresponds to the received input video signal 112.

Figure 2:
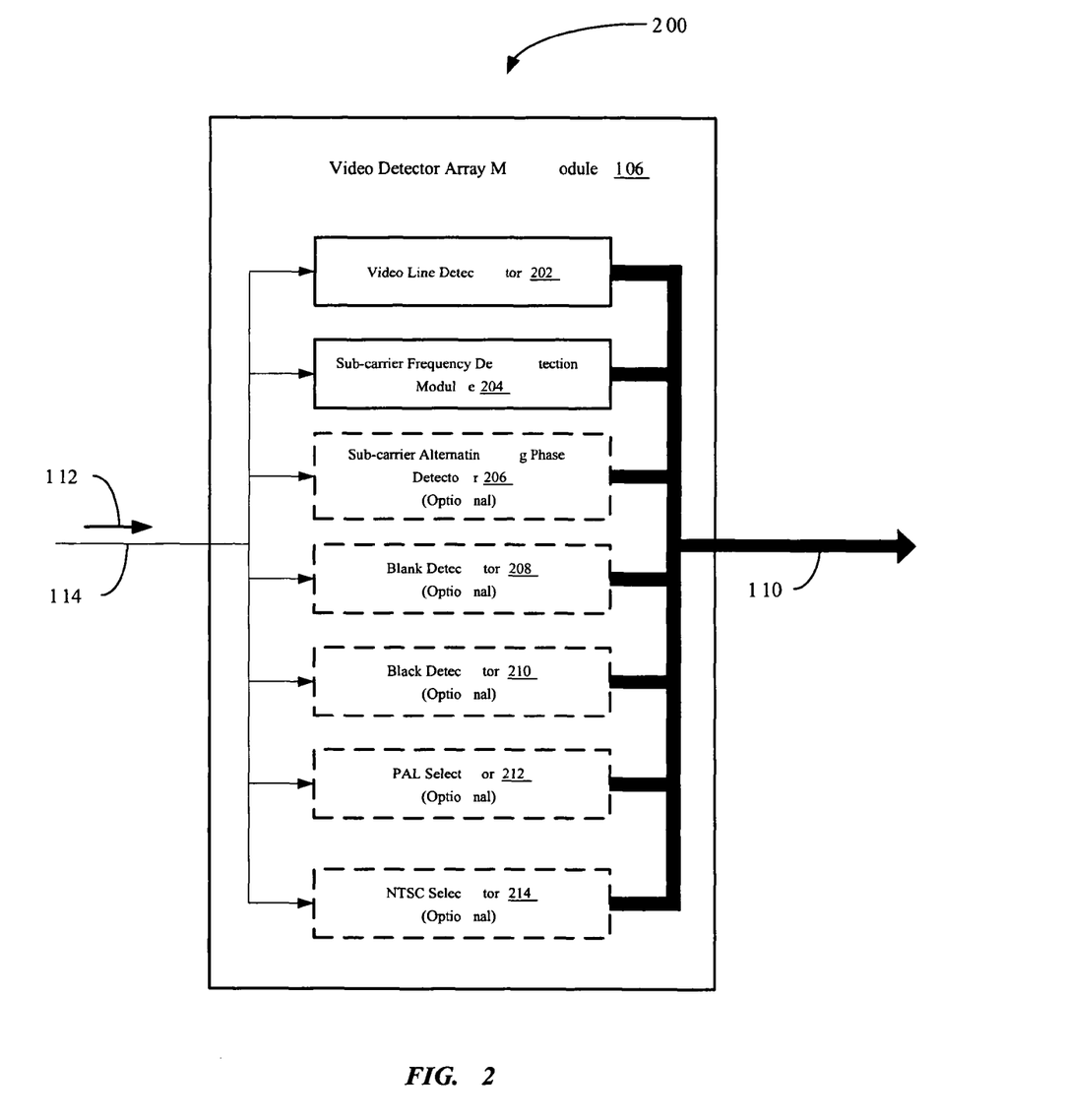
FIG. 2 is a functional block diagram of an example of an implementation of the video detector array module shown in FIG. 1.

In FIG. 2, a functional block diagram 200 of an example of an implementation of the video detector array module 106 of FIG. 1 is shown. The video detector array module 106 may include a video line detector 202, a sub-carrier frequency detection module 204, an optional sub-carrier alternating phase detector 206, an optional blank detector 208, an optional black detector 210, an optional PAL selector 212, and an optional NTSC selector 214. The video line detector 202, sub-carrier frequency detection module 204, optional sub-carrier alternating phase detector 206, optional blank detector 208, optional black detector 210, optional PAL selector 212, and optional NTSC selector 214 may each receive the received input video signal 112, via signal path 114, and, in response, correspondingly detect and measure a corresponding metric value from the received input video signal 112. The measured metric values may then be passed to the state machine 108 via signal path 110.

Figure 3:
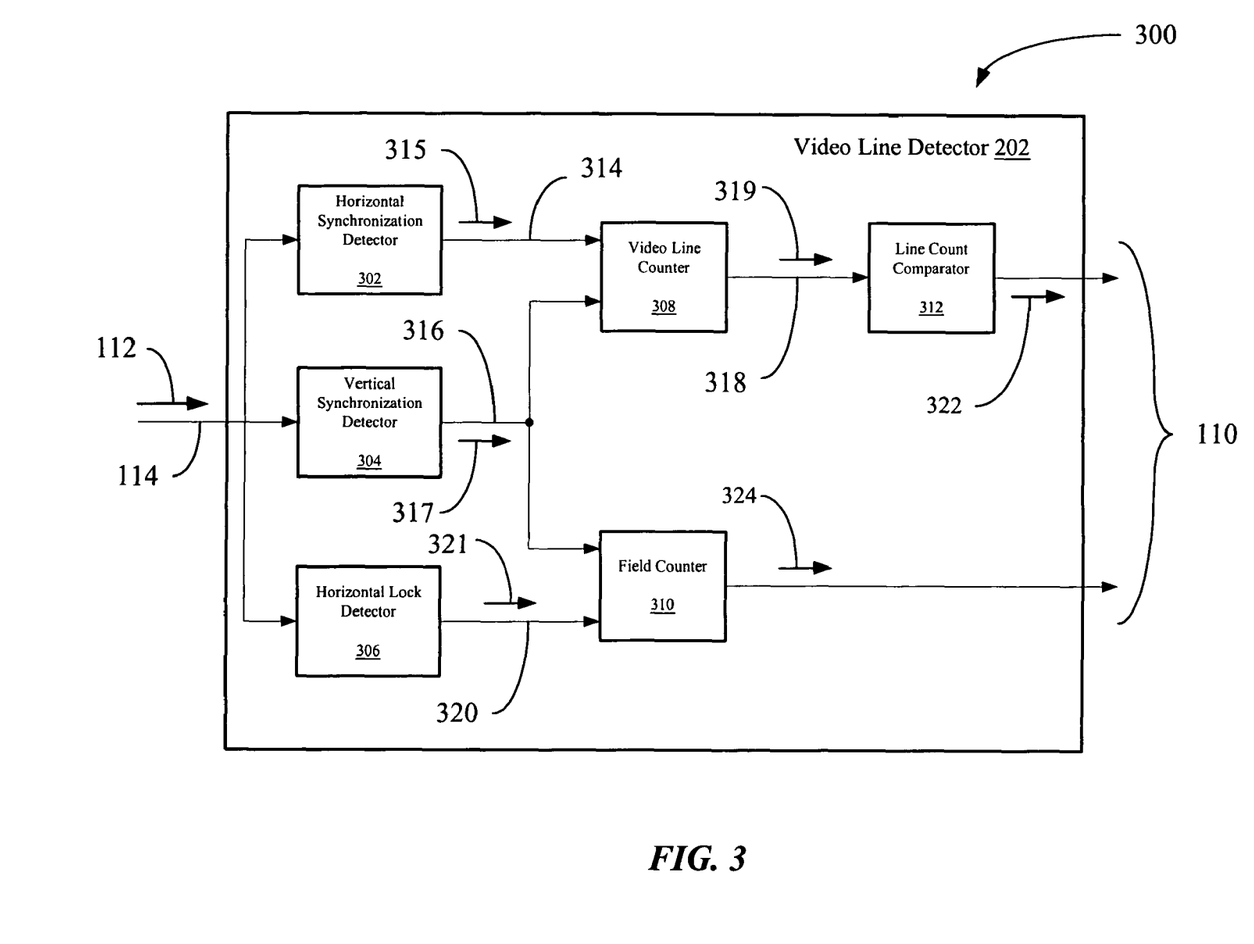
FIG. 3 is a functional block diagram of an example of an implementation of the video line detector shown in FIG. 2.

As an example of operation, the video detector array module 106 may detect and measure a metric value corresponding to the number-of-lines-per-frame and the color sub-carrier frequency of the received input video signal 112 with the video line detector 202 and sub-carrier frequency detection module 204, respectively. The video detector array module 106 may also optionally detect and measure the metric values corresponding to the phase-alternation, blank level, and/or black level with optional phase-alternation detector 206, optional blank detector 208, and/or optional black detector 210, respectively. By detecting and measuring the number-of-lines-per-frame and the color sub-carrier frequency of the received input video signal 112, the AVD 102 is able to detect and identify the type of transmission format of the received input video signal 112 into NTSC, PAL, or SECAM because: 1) NTSC and NTSC-J transmissions have 525 number-of-lines-per-frame with a color sub-carrier frequency of 3.58 megahertz ("Mhz"); 2) PAL-B, PAL-D, PAL-G, PAL-H, PAL-I, and PAL-N transmissions have 625 number-of-lines-per-frame with a color sub-carrier frequency of 4.43 Mhz; 3) PAL-M transmissions have 525 number-of-lines-per-frame with a color sub-carrier frequency of 3.58 Mhz; 4) PAL-Nc transmissions have 625 number-of-lines-per-frame with a color sub-carrier frequency of 3.58 Mhz; and 5) SECAM transmissions have 625 number-of-lines-per-frame with alternating color sub-carrier frequencies of 4.25 and 4.40 Mhz. Table 1 shows the metric values of the different transmission formats.

zation detector 304, and line count comparator 312 via signal paths 314, 316, and 318, respectively. The field counter 310 may be in signal communication with both the vertical synchronization detector 304 and horizontal lock detector 306 via signal paths 316 and 320, respectively.

It is appreciated by those skilled in the art that detecting horizontal synchronization, horizontal lock, and vertical synchronization of a received video signal are well known detection techniques in the art and, therefore, the horizontal synchronization detector 302, vertical synchronization detector 304, horizontal lock detector 306 may be implemented by well-known techniques. As an example, the horizontal synchronization detector 302 may be any circuit or module configured to measure the horizontal synchronization of the received input video signal 112 and produce a horizontal synchronization detection ("hysnc_detect") pulse signal 315 that is passed to the video line counter 308 via signal path 314. Similarly, the vertical synchronization detector 304 may be any circuit or module configured to measure the vertical synchronization of the received input video signal 112 and produce a vertical synchronization detection ("vysnc_detect") pulse signal 317 that is passed to the video line counter 308 and field counter 310 via signal path 316. Moreover, the

TABLE 1

Transmission Formats versus Measured Metrics

| Measured Metric | Transmission Formats | | | | | | |
|---|---|---|---|---|---|---|---|
| | NTSC | NTSC-J | PAL-B, D, G, H, & I | PAL-N | PAL-M | PAL-Nc | SECAM |
| Number-of-lines-per-frame | 525 | 525 | 625 | 625 | 525 | 625 | 625 |
| Color Sub-carrier Freq (Mhz) | 3.58 | 3.58 | 4.43 | 4.43 | 3.58 | 3.58 | 4.25/4.40 |
| Alternating Phase | no | no | yes | yes | yes | yes | no |
| Black Level | 7.5 IRE | 0 IRE | 0 IRE | 7.5 IRE | 7.5 IRE | 0 IRE | 0 IRE |
| Vertical Synchronization Interval | 3 H | 3 H | 2.5 H | 3 H | 3 H | 2.5 H | 2.5 H |

Additionally, by optionally detecting and measuring the additional optional metric values, the AVD 102 may be capable of detecting a greater number of variations of the NTSC, PAL, or SECAM transmission formats. As an example, these additional metrics may allow the AVD 102 to discern the differences between NTSC and NTSC-J, or PAL-BDGHI and PAL-N.

Without the additional metrics, the AVD 102 may utilize optional inputs such as a NTSC select and/or PAL select that may be manually provided by a user. In this example, the PAL select and NTSC select would generally not be measured metrics but rather user supplied inputs used to determine a preferred standard when the number of lines per frame and subcarrier frequency are not sufficient to determine format. As an example, the NTSC select may be utilized to select between NTSC and NTSC-J and the PAL select may be utilized to select between PAL-N and PAL-BDGHI.

In FIG. 3, a functional block diagram 300 of an example of an implementation of the video line detector 202 of FIG. 2 is shown. The video line detector 202 may include a horizontal synchronization detector 302, vertical synchronization detector 304, horizontal lock detector 306, video line counter 308, field counter 310, and line count comparator 312. The video line counter 308 may be in signal communication with the horizontal synchronization detector 302, vertical synchronihorizontal lock detector 306 may be any circuit or module configured to measure the horizontal lock of the received input video signal 112 and produce a horizontal lock ("horiz_lock") signal 321 that is passed to the field counter 310 via signal path 320.

In an example of operation, the video line detector 202 determines whether the received input video signal 112 is either 625 or 525 number-of-lines-per-frame by first counting, in the video line counter 308, the number of hysnc_detect pulse signals 315 (produced by the horizontal synchronization detector 302) between vysnc_detect pulse signals 317 (produced by the vertical synchronization detector 304). This line count ("line_cnt") 319 is passed to the line count comparator 312, via signal path 318, and the line count comparator 312 then compares the line_cnt 319 against two distinct ranges, one for 525 number-of-lines-per-frame video formats (such as NTSC, NTSC-J and PAL-M) and one for 625 number-of-lines-per-frame video formats (such as PAL-B, PAL-D, PAL-G, PAL-H, PAL-I, PAL-N, PAL-Nc, and SECAM). If the line_cnt 319 value falls within one of these two ranges, the video line detector 202 has detected the number-of-lines-per-frame of the received input video signal 112 and the line count comparator 312 produces a line count value ("line_count") 322 that is passed to the state machine 108 via signal path 110.

The field counter 310 may be utilized to verify that the line_count 322 is valid, preventing the video line detector 202 from producing a mistake line_count 322 as a result of losing the horizontal lock of received input video signal 112. As an example, if the horizontal lock detector 306 loses horizontal lock of the received input video signal 112, the field counter 310 waits for a predetermined number of fields before producing a line count detect bit ("line_count_detect") signal 324 that indicates that the current line_count 322 value is correct. The wait for the predetermined number of fields is determined by the amount of time needed to allow the signals produced by the detectors 302, 304, and 306 to stabilize. The line_count_detect signal 324 is then passed to the state machine 108 with line_count 322 via signal path 110.

Figure 4:
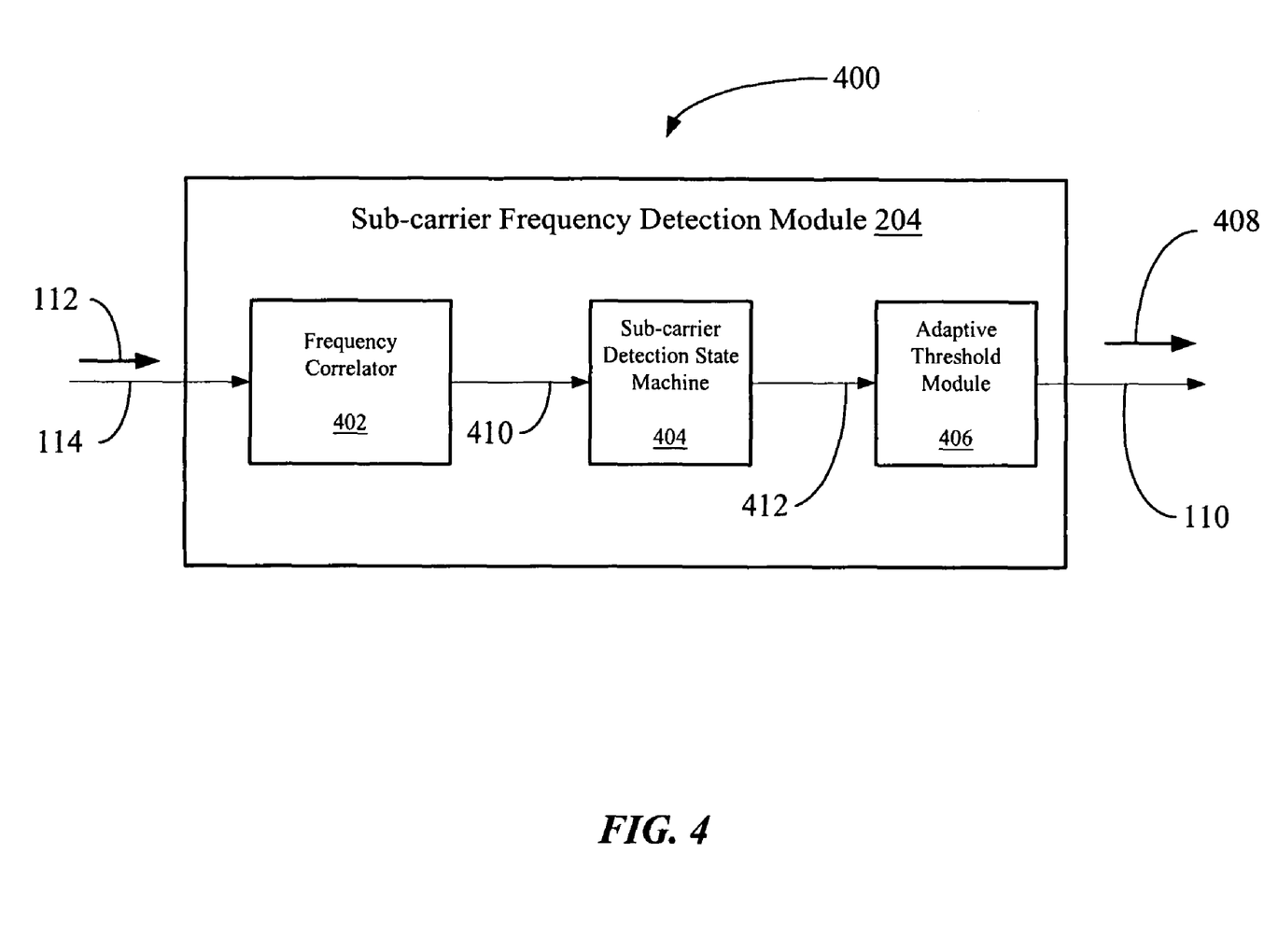
FIG. 4 is a functional block diagram of an example of an implementation of the sub-carrier detection module shown in FIG. 2.

In FIG. 4, a functional block diagram 400 of an example of an implementation of the sub-carrier frequency detection module 204 of FIG. 2 is shown. The sub-carrier frequency detection module 204 may be configured to measure the color sub-carrier frequency and may include a frequency correlator 402, sub-carrier detection state machine 404, and an adaptive threshold module 406. The frequency correlator 402 receives the received input video signal 112, via signal path 114, and the adaptive threshold module 406 produces a color sub-carrier frequency measurement value 408 that is passed to the state machine 108 via signal path 110. The sub-carrier detection state machine 404 is in signal communication with both the frequency correlator 402 and adaptive threshold module 406 via signal paths 410 and 412, respectively.

In an example of operation, the frequency correlator 402 and sub-carrier detection state machine 404 are utilized to check different frequencies to distinguish between the different potential transmission formats of the received input video signal 112. The output of the sub-carrier detection state machine 404 is then compared to a threshold value in the adaptive threshold module 406 to determine if a color sub-carrier frequency has been detected.

The sub-carrier frequency detection module 204 may also include a convergence detector (not shown) that in signal communication with both the frequency correlator 402 and sub-carrier detection state machine 404. The convergence detector is a module/device that is capable of determining between transmission formats that are very similar in frequency but are not the same. As an example, some transmission formats may be the same to four significant digits but not to eight. Generally, this may cause the sub-carrier frequency detection module 204, once it is locked to one transmission format, to not lock to another transmission format that is similar in frequency. The convergence detector may be configured to make a logical decision, in this example, to set the sub-carrier frequency detection module 204 to the second transmission format because the common frequency has been detected but the sub-carrier frequency detection module is not converging.

Figure 5:
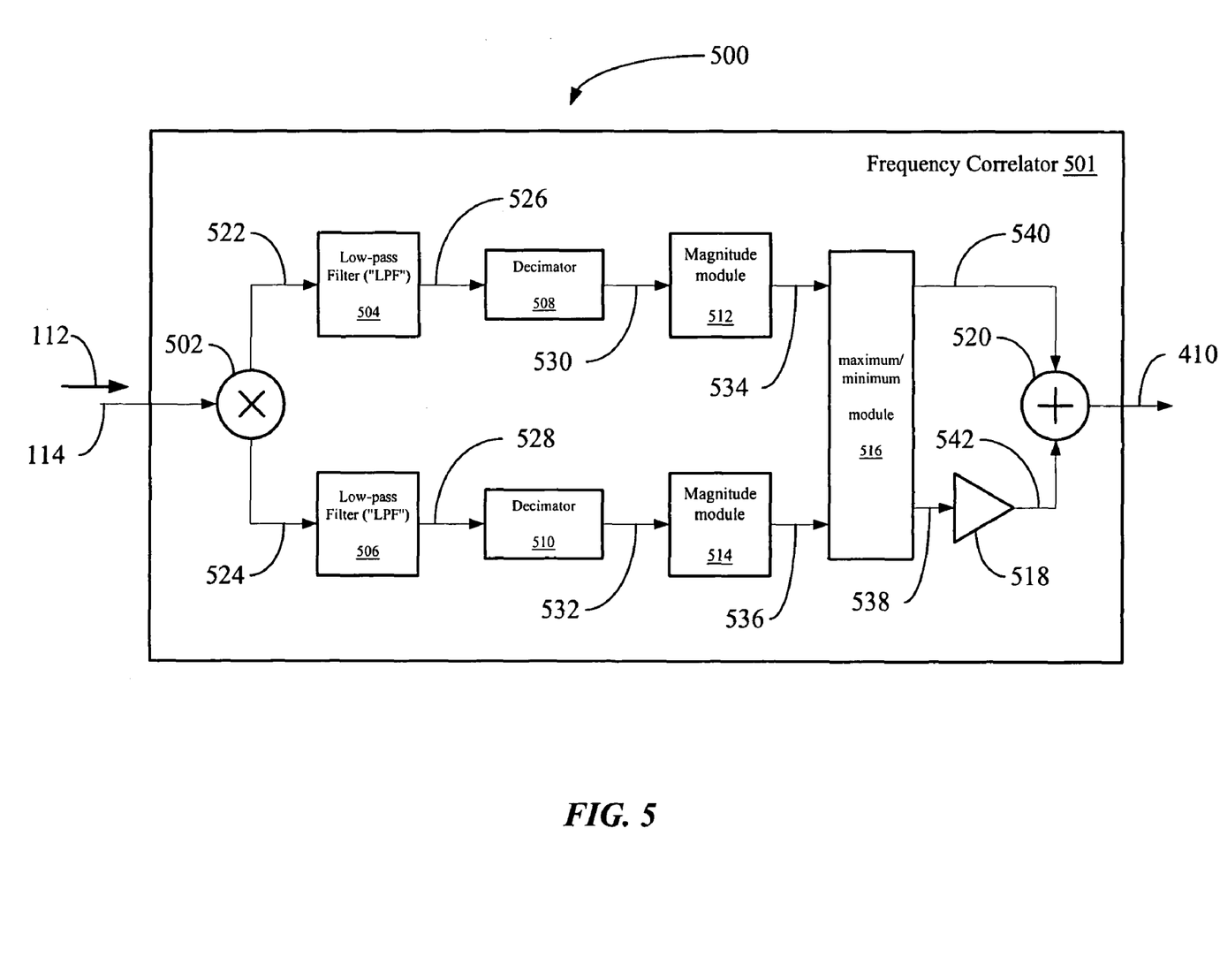
FIG. 5 is a functional block diagram of an example of an implementation of the frequency correlator shown in FIG. 4.

In FIG. 5, a functional block diagram 500 of an example of an implementation of the frequency correlator 501 of FIG. 4 is shown. The frequency correlator 501 may include a complex rotator 502, low-pass filters ("LPFs") 504 and 506, decimators 508 and 510, magnitude modules 512 and 514, maximum/minimum module 516, buffer 518, and summer 520. The complex rotator 502 may be in signal communication with LPFs 504 and 506, via signal paths 522 and 524, respectively. The decimators 508 and 510 are in signal communication with the LPFs 504 and 506 and the magnitude modules 512 and 514 via signal paths 526, 528, 530, and 532, respectively. As an example, the decimators 508 and 510 may be decimators that decimate by 128. The maximum/minimum module 516 may be in signal communication with the magnitude modules 512 and 514, buffer 518, and summer 520 via signal paths 534, 536, 538, and 540, respectively. The buffer 518 may be in signal communication with the summer 520 via signal path 542.

In an example of operation, the frequency correlator 501 receives the received input video signal 112, via signal path 114, at complex rotator 502 which produces in-phase ("I") and quadrature-phase ("Q") components of the received input video signal 112. The I component is passed to LPF 504 and the Q component is passed to LPF 506 via signal paths 522 and 524, respectively. The LPFs 504 and 506 low-pass filter the I and Q components of the received input video signal 112 and produce filtered outputs that are passed to the decimators 508 and 510 via signal paths 526 and 528, respectively. The decimators 508 and 510 decimate the received filtered outputs and pass the decimated outputs to the magnitude modules 512 and 514 via signal paths 530 and 532, respectively. The magnitude modules 512 and 514 produce magnitude outputs that are the absolute value of the received decimated outputs and then pass those magnitude outputs to the maximum/minimum module 516 via signal paths 534 and 536, respectively. The maximum/minimum module 516 then produces a maximum value between the received magnitude values of both I and Q components that may be represented by max(I, Q) and a minimum value between the received magnitude values of both I and Q components that may be min(I,Q). The min(I,Q) may be passed via signal path 538 to buffer 518 that may be an attenuator such as, for example, a ¼ attenuator that reduces the min(I,Q) signal by 75%. The output of the buffer may then be passed to summer 520, via signal path 542, and combined with the max(I,Q) signal that is passed to the summation 520 via signal path 540. The summer 520 then produces a vector magnitude that is approximated by max(I,Q)+(¼)*min(I,Q) which is output via signal path 410 to the sub-carrier detection state machine 404.

In this example, the frequency correlator 501 may be utilized with the sub-carrier detection state machine 404 to check for two different frequencies such as 3.58 Mhz, and 4.43 Mhz sub-carrier frequency. To distinguish between a SECAM sub-carrier frequency and a constant 4.43 Mhz, two adjacent lines may be checked for an alternating pattern of true and false readings. Since the two SECAM sub-carrier frequencies are approximately 150 Khz apart, this may be utilized to set the upper limit on the resolution bandwidth of the frequency correlator 402 and the other sub-carrier may be rejected. Additionally, the lower limit may be set by the distance from the upper SECAM sub-carrier frequency to the 4.43 Mhz carrier, which is approximately 30 Khz. Again, the vector magnitude for this example would be approximated by: max(I, Q)+(¼)*min(I,Q).

Figure 6:
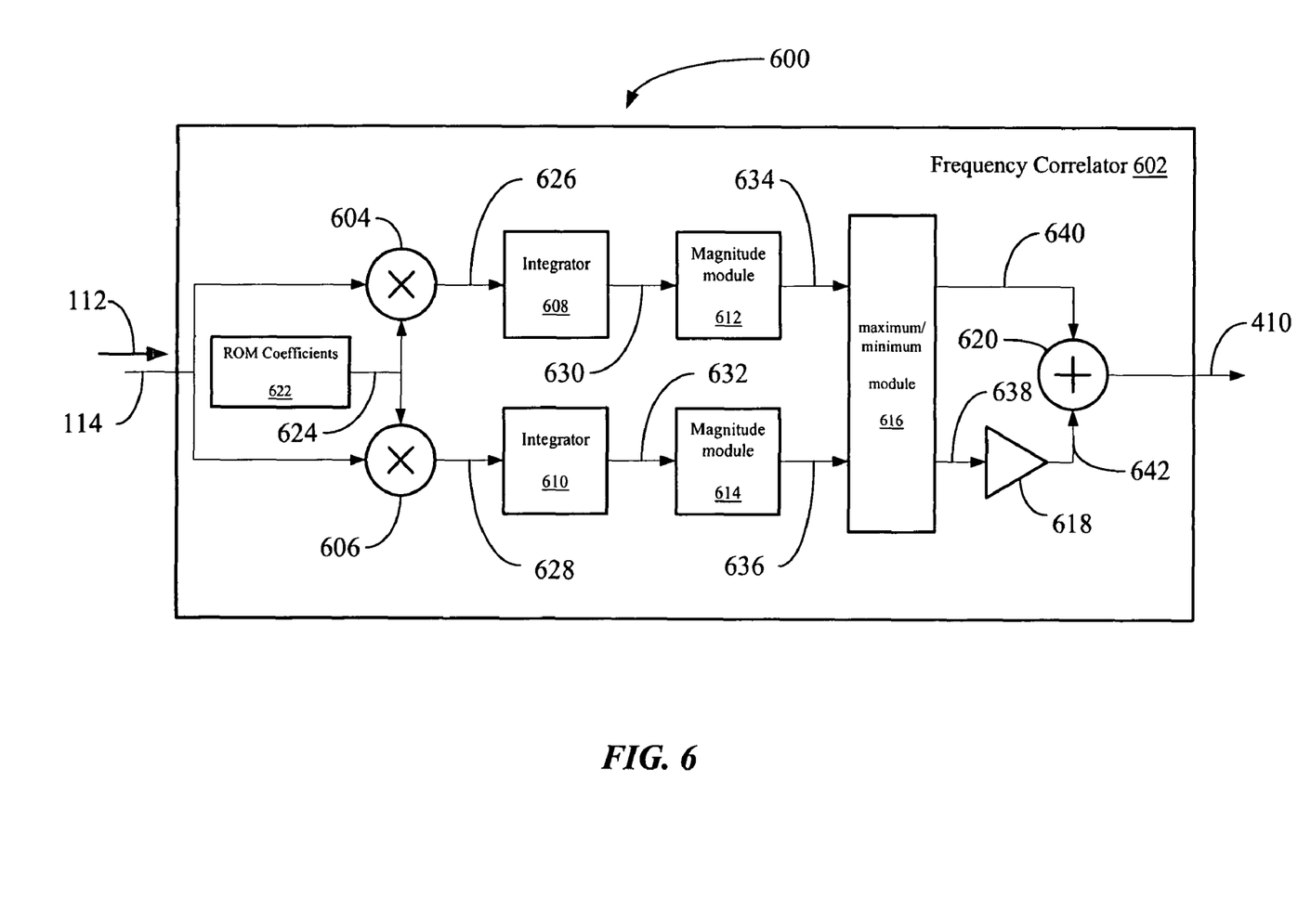
FIG. 6 is a functional block diagram of another example of an implementation of the frequency correlator shown in FIG. 4.

In FIG. 6, a functional block diagram 600 of another example of an implementation of the frequency correlator 602 of FIG. 4 is shown. The frequency correlator 602 may include complex rotators 604 and 606, integrators 608 and 610, magnitude modules 612 and 614, maximum/minimum module 616, buffer 618, and summer 620. The complex rotators 604 and 606 may be in signal communication with a read only memory ("ROM") coefficients generator 622 and the integrators 608 and 610, via signal paths 624, 626, and 628, respectively. The integrators 608 and 610 may be in signal communication with the magnitude modules 612 and 614 via signal paths 630 and 632, respectively. The maximum/minimum module 616 may be in signal communication with the magnitude modules 612 and 614, buffer 618, and summer 620 via signal paths 634, 636, 638, and 640, respectively. The buffer 618 may be in signal communication with the summer 620 via signal path 642.

In an example of operation, the frequency correlator 602 receives the received input video signal 112, via signal path 114, at complex rotators 604 and 606 that multiply the received input video signal 112 against ROM coefficients produced by the ROM coefficient generator 622 to produce in-phase ("I") and quadrature-phase ("Q") components of the received input video signal 112. The I component is passed to integrator 608 and the Q component is passed to integrator 610 via signal paths 626 and 628, respectively. The integrators 608 and 610 accumulate the multiplied I and Q components of the received input video signal 112 produced by the complex rotators 604 and 606 and produce accumulated outputs that are passed to the magnitude modules 612 and 614 via signal paths 630 and 632, respectively. The magnitude modules 612 and 614 produce magnitude outputs that are the absolute value of the received accumulated outputs and then pass those magnitude outputs to the maximum/minimum module 616 via signal paths 634 and 636, respectively. The maximum/minimum module 616 then produces a maximum value between the received magnitude values of both I and Q components that may be represented by max(I,Q) and a minimum value between the received magnitude values of both I and Q components that may be min(I,Q). The min(I,Q) may be passed via signal path 638 to buffer 618 that may be an attenuator such as, for example, a quarter-attenuator that reduces the min(I,Q) signal by 75%. The output of the buffer may then be passed to summer 620, via signal path 642, and combined with the max(I,Q) signal that is passed to the summation 620 via signal path 640. The summer 620 then produces a vector magnitude that is approximated by max(I,Q)+ (¼)*min(I,Q), which is output via signal path 410 to the sub-carrier detection state machine 404.

This example of an implementation of the frequency correlator 602 may be a simplified example compared to the example of an implementation of the correlator 501 shown in FIG. 5 because in this example the correlator 602 may operate on a single color burst, producing one magnitude sample per line. First, the LPFs 504 and 506 and decimators 508 and 510 are replaced by a polyphase decimation filter (not shown) with, for example, 128 phases which utilizes a single tap. In this example, the complex rotation over 128 samples (performed by complex rotator 502 in FIG. 5) is then convolved with the coefficients of the filter, removing the need for separate multipliers. As an example, the coefficient ROM of the ROM coefficients generator 622 may have two tables, one for 3.58 Mhz and one for 4.43 Mhz. As a result, the combined rotator/filter (not shown) may be implemented utilizing a multiply-accumulate architecture that includes complex rotators 604 and 606, integrators 608 and 610, and ROM coefficients generator 622.

Figure 7:
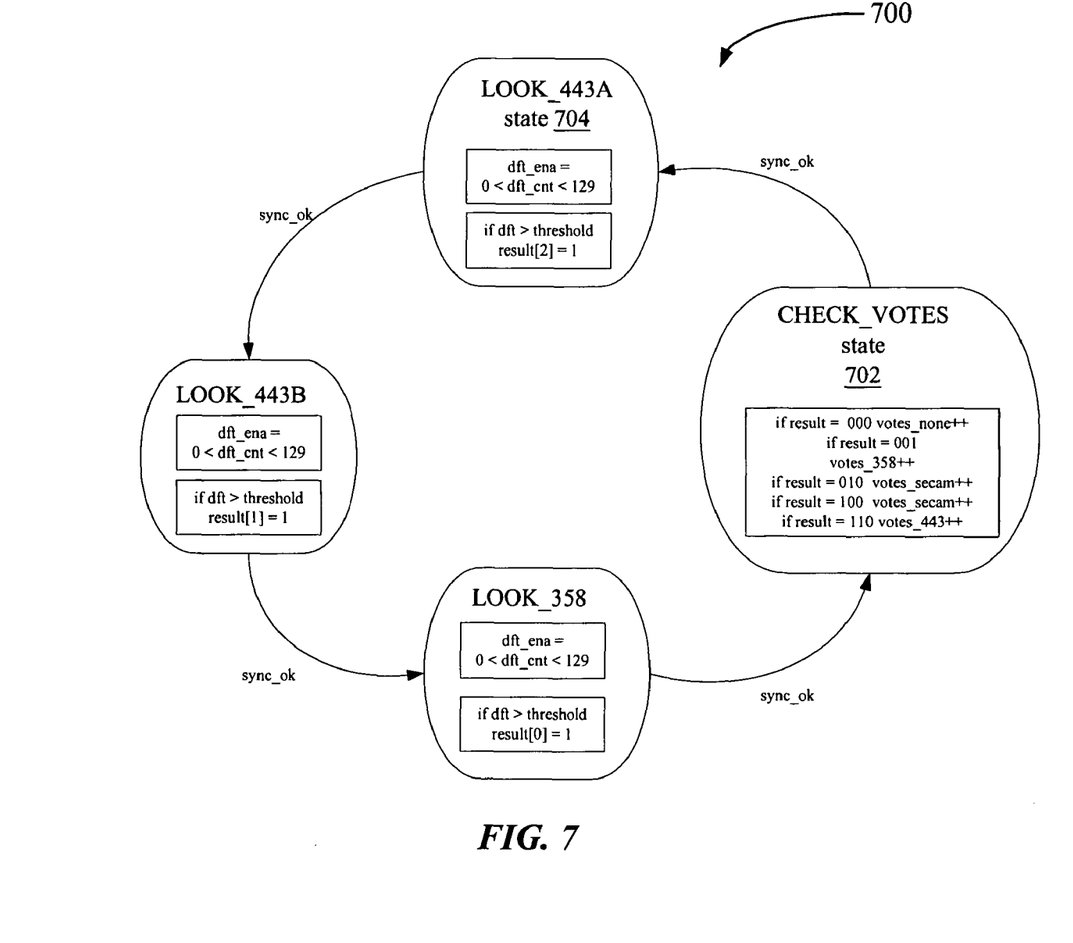
FIG. 7 is a state diagram of an example of an implementation of the sub-carrier detection state machine shown in FIG. 4.

In FIG. 7, a state diagram 700 of an example of an implementation of the sub-carrier detection state machine 404 of FIG. 4 is shown. The sub-carrier detection state machine 404 may be a finite state machine that controls the correlator frequency selection, as well as resetting the integrators 608 and 610 of FIG. 6 after a color burst. When the frequency correlator (which may be a Discrete Fourier Transform "DFT" module) produces a level that exceeds a threshold value, a result register bit (not shown) is set in the state machine 108. When in the "CHECK_VOTES" state 702, this register is checked for valid combinations that may be predetermined by the design of the state machine 404. If a valid combination is found, a vote counter for that particular selection is incremented. As soon as the number of votes for any particular frequency reaches 7, the detection block may declare a lock and output that frequency. The state machine 404 then zeros out all the votes and starts over.

In general, the state machine decodes the transmission metrics to determine the transmission format of the received video signal. The state machine decodes the transmission metrics by monitoring the at least two transmission metrics with the state machine and in response determines the transmission format of the received video signal. Generally, monitoring the at least two transmission metrics at least two transmission metrics for a predetermined amount of time with the state machine and wherein determining the transmission format includes determining if the detected at least two transmission metrics are stable within the predetermined amount of time.

Figure 8:
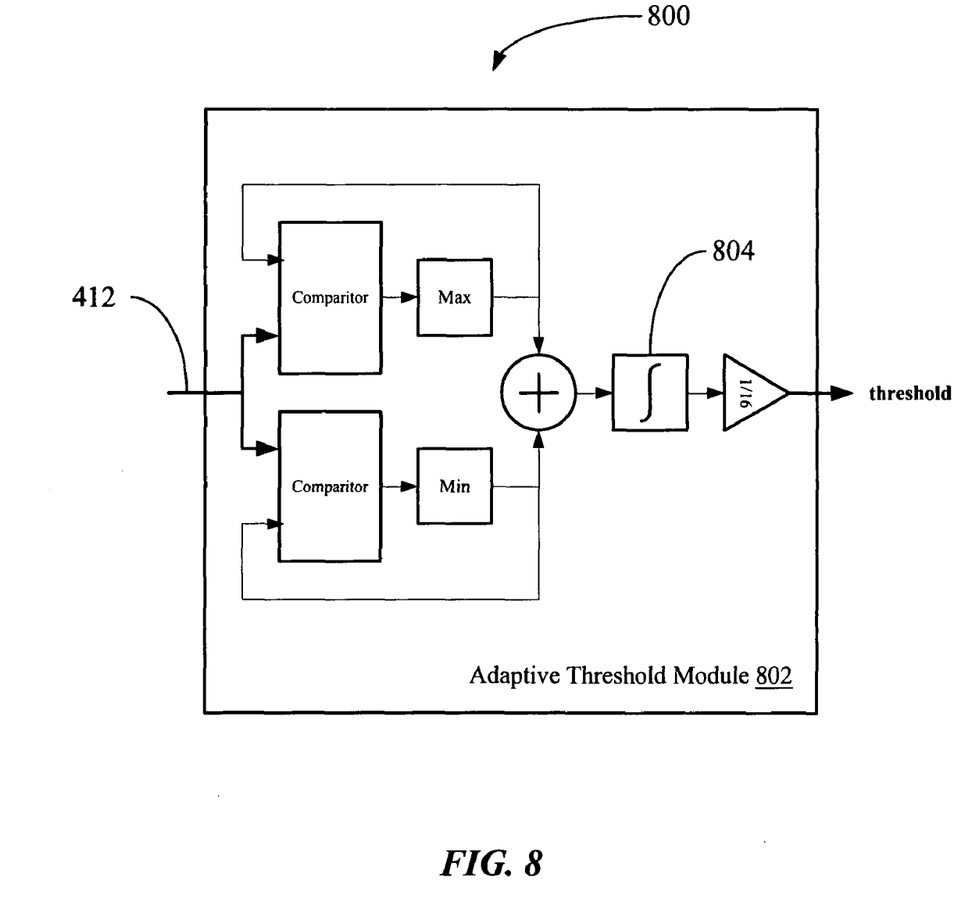
FIG. 8 is a functional block diagram of an example of an implementation of the adaptive threshold module shown in FIG. 4.

In FIG. 8, a functional block diagram 800 of an example of an implementation of the adaptive threshold module 802 of FIG. 4 is shown. In FIG. 8, the DFT output 412 is compared to a threshold value, which is found by averaging the minimum and maximum levels output from the DFT. In general, only one frequency should be present; therefore this frequency may provide a lower limit based on the noise energy of the signal and an upper limit based on the carrier energy, and sets the threshold halfway between the two. A loop filter provides additional filtering of this signal. As an example, all the flops may by be clocked on sync_ok, while the Min/Max registers are loaded on LOOK_443A state 704, FIG. 7, and the integrator 804 on the CHECK_VOTES state 702, FIG. 7.

Figure 9:
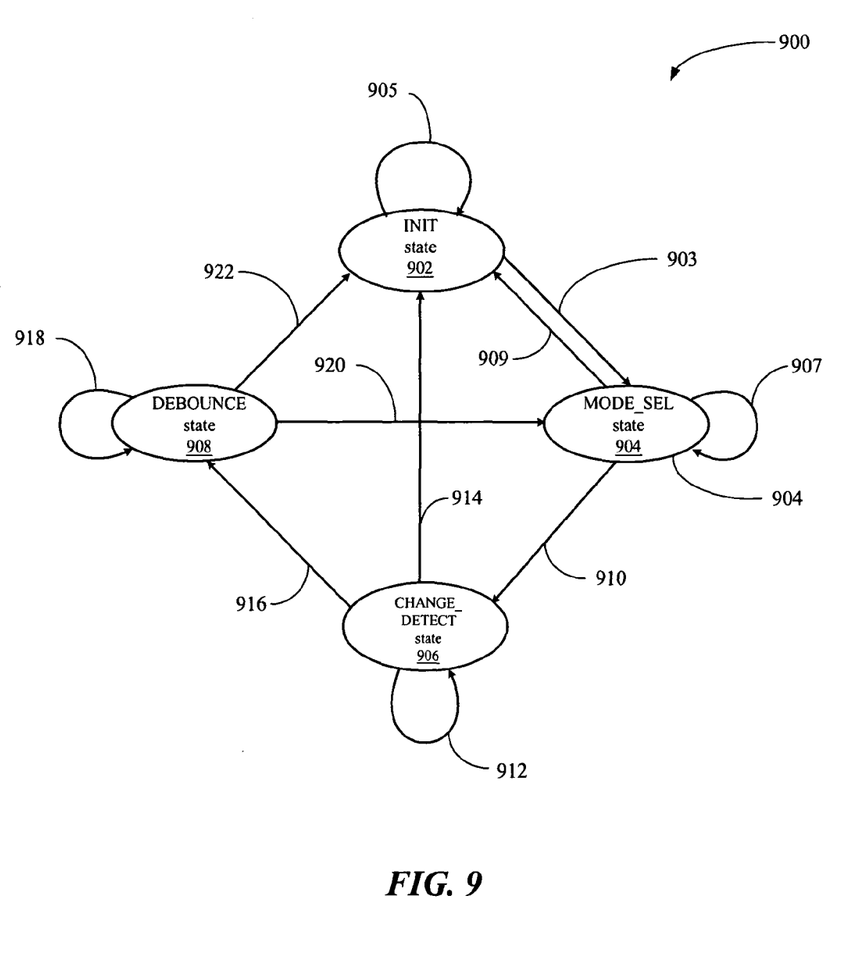
FIG. 9 is a state diagram of an example of an implementation of the state machine shown in FIG. 1.

In FIG. 9, a state diagram 900 of an example of an implementation of the state machine 108 shown of FIG. 1 is shown. As an example of operation, the initialization state ("INIT state") 902 may wait for the horizontal lock indication ("hlock") while not in reset before proceeding. AVD returns to its default value when the reset is active, otherwise it is left unchanged (including when hlock goes inactive). The state machine 108 proceeds 903 from INIT state 902 to a mode select state ("MODE_SEL state") 904 when hlock is active. If instead, hlock goes inactive, reset goes active, or if the user prompts an AVD reset via the AVD_acquire programmable register bit, the state machine 108 stays in the INIT state 902. In the case of reset going active, AVD may be assigned its default value.

In the MODE_SEL state 904, the state machine 108 performs a mode selection based upon the number of video lines per frame, sub-carrier frequency, and alternating phase inputs. The state machine 108 then waits 907 in MODE_SEL state 904 until the number of lines per frame is detected. If hlock goes inactive, reset goes active, or if the user prompts an AVD reset via the AVD_acquire programmable register bit, the state machine 108 returns 909 to the INIT state 902. If instead, the state machine 108 selects the current video format, the state machine 108 proceeds 910 from MODE_SEL state 904 to a detection of change in video format state ("CHANGE_DETECT state") 906.

In the CHANGE_DETECT state 906, the state machine 108 monitors the multiple inputs in an attempt to detect any change in the video format. The state machine 108 then waits 912 in the CHANGE_DETECT state 906 until a change is detected in at least one of the multiple input values or if hlock goes inactive. If hlock goes inactive, reset goes active, or if the user prompts an AVD reset via the AVD_acquire programmable register bit, the state machine 108 returns 914 to the INIT state 902. In instead, the state machine 108 detects a change in at least one of the multiple input parameters, the state machine 108 proceeds 916 from the CHANGE_DETECT state 906 to a debounce state ("DEBOUNCE state") 908.

In the DEBOUNCE state 908, in the event of a detected mode change without the loss of horizontal lock signal, the state machine 108 determines whether the new mode is stable for a programmable (i.e., predetermined) number of frames prior to switching over to the new mode. This is to prevent glitches in the detect logic from changing the video mode falsely. The state machine 108 waits 918 in the DEBOUNCE state 908 for a programmable number of fields ("debounce_cnt"), checking on every clock to verify that the new input settings remain stable. In the event that the inputs are not stable for the programmable number of fields, the count resets and begins again. When the detected format remains stable for the programmed number of frames, the state machine 108 returns 920 to the MODE_SEL state 904 from the DEBOUNCE state 908 and updates AVD. If hlock goes inactive, reset goes active, or if the user prompts an AVD reset via the AVD_acquire programmable register bit, the state machine 108 returns 922 to the INIT state 902.

Figure 10:
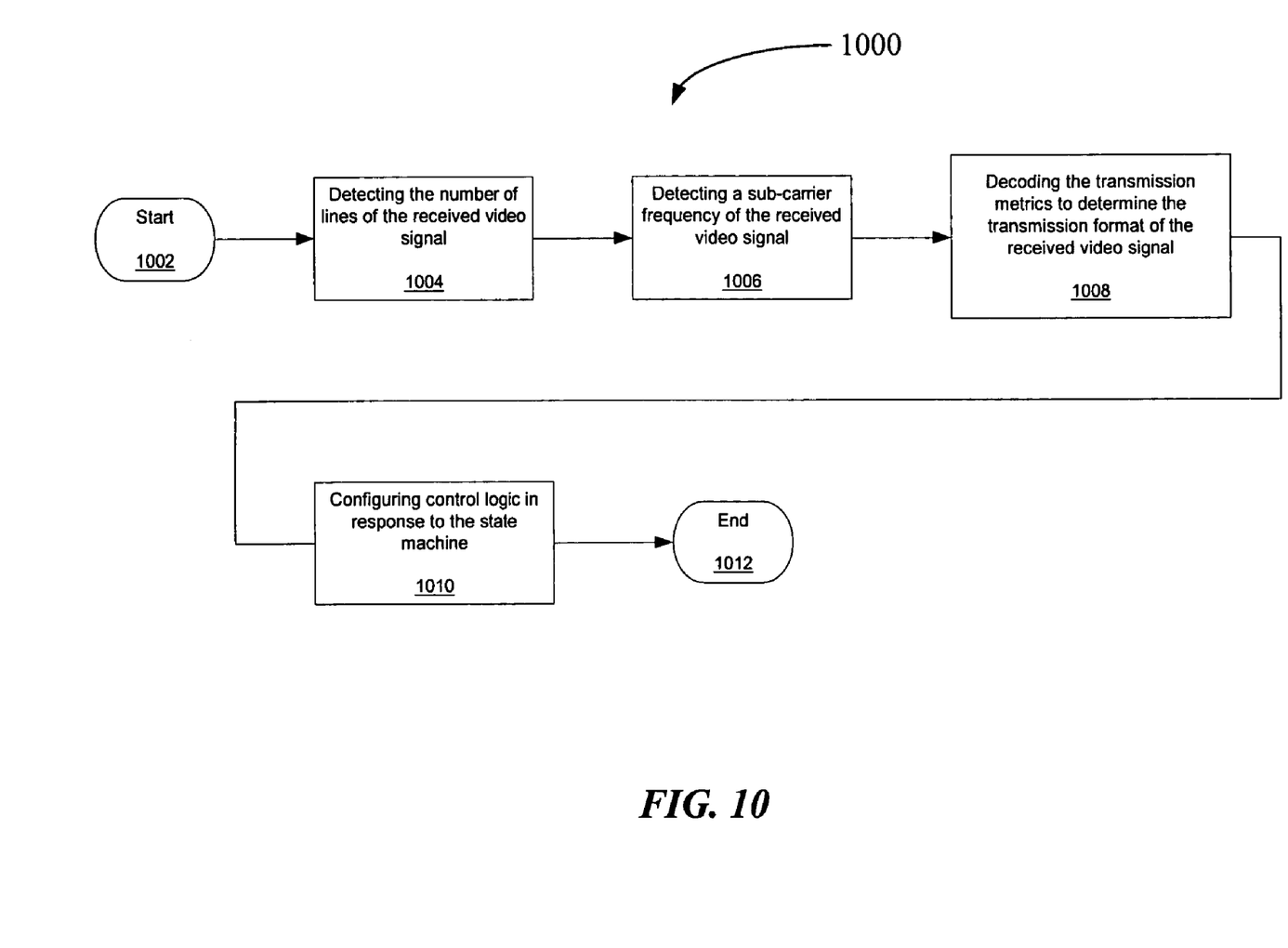
FIG. 10 is a flowchart diagram of an example of operation of the AVD shown in FIG. 1.

In FIG. 10, a flowchart diagram of an example of operation of the AVD 102 of FIG. 1 is shown. The process begins in step 1002 and the AVD 102 detects at least two transmission metrics. As an example, in step 1004, the AVD 102 detects the number of lines of the received video signal. The AVD 102 then detects a sub-carrier frequency of the received video signal in step 1006. After detecting the number of lines and the sub-carrier frequency, the AVD 102 decodes the transmission metrics to determine the transmission format of the received video signal. In step 1010, the AVD 102 then configures control logic, which may be optionally part of the AVD 102, in response to the state machine and the process ends in step 1012.

Persons skilled in the art will understand and appreciate that one or more processes, sub-processes, or process steps described in FIG. 10 may be performed by hardware and/or software. Additionally, the AVD 102 may be implemented completely in software that would be executed within a microprocessor, general purpose processor, combination of processors, digital signal processor ("DSP"), and/or application specific integrated circuit ("ASIC"). If the process is performed by software, the software may reside in software memory in the controller. The software in software memory may include an ordered listing of executable instructions for implementing logical functions (i.e., "logic" that may be implemented either in digital form such as digital circuitry or source code or in analog form such as analog circuitry or an analog source such as an analog electrical, sound or video signal), and may selectively be embodied in any computer-readable (or signal-bearing) medium for use by or in connection with an instruction execution system, apparatus, or device, such as a computer-based system, processor-containing system, or other system that may selectively fetch the instructions from the instruction execution system, apparatus, or device and execute the instructions. In the context of this document, a "computer-readable medium" and/or "signal-bearing medium" is any means that may contain, store, communicate, propagate, or transport the program for use by or in connection with the instruction execution system, apparatus, or device. The computer readable medium may selectively be, for example but not limited to, an electronic, magnetic, optical, electromagnetic, infrared, or semiconductor system, apparatus, device, or propagation medium. More specific examples, but nonetheless a non-exhaustive list, of computer-readable media would include the following: an electrical connection (electronic) having one or more wires; a portable computer diskette (magnetic); a RAM (electronic); a read-only memory "ROM" (electronic); an erasable programmable read-only memory (EPROM or Flash memory) (electronic); an optical fiber (optical); and a portable compact disc read-only memory "CDROM" (optical). Note that the computer-readable medium may even be paper or another suitable medium upon which the program is printed, as the program can be electronically captured, via, for instance, optical scanning of the paper or other medium, then compiled, interpreted or otherwise processed in a suitable manner if necessary, and then stored in a computer memory.

While various preferred and alternative embodiments of the present intention are described herein, it will be apparent to one of ordinary skill in the art after reading this description that there are various modifications and extensions of the above described technology that may be implemented using these teachings without departing from the spirit and scope of the present invention, the breadth and scope of which shall be defined by following claims.

What is claimed is:

1. An Automatic Video Detector ("AVD") comprising:
   a video detector array module generating two or more transmission metrics of a received video signal for a predetermined amount of time; and
   a state machine in signal communication with the video detector array module and detecting a transmission format of the received video signal based on the generated metrics;
   wherein the video detector array module includes a video line detector and a sub-carrier frequency detection module, wherein the video detector array module further includes a sub-carrier alternating phase detector, and wherein the video detector array module further includes a blank detector.

2. The AVD of claim 1, wherein the video detector array module further includes a black detector.

3. The AVD of claim 1, wherein the video detector array module further includes a user programmable NTSC selector.

4. The AVD of claim 1, wherein the video detector array module further includes a user programmable PAL selector.

5. A method for detecting the transmission format of a received video signal, the method comprising:
   detecting at least two transmission metrics from a plurality of transmission metrics; and
   decoding the transmission metrics with a state machine to determine the transmission format of the received video signal if the transmission metrics are stable over time;
   wherein decoding includes monitoring the at least two transmission metrics with the state machine and determining the transmission format of the received video signal in response to monitoring the at least two transmission metrics, wherein monitoring includes monitoring the at least two transmission metrics for a predetermined amount of time with the state machine, wherein determining the transmission format further includes determining if the detected at least two transmission metrics are stable within the predetermined amount of time, wherein detecting the at least two transmission metrics includes detecting the number of lines of the received video signal and detecting a sub-carrier frequency of the received video signal, further including detecting another transmission metric, wherein the other transmission metric is one of a blank level and a black level.

6. The method of claim 5, wherein the other transmission metric is sub-carrier phase alternation.

7. The method of claim 6, wherein the other transmission metric is the other of the blank level and the black level.

8. An Automatic Video Detector ("AVD") comprising:
   a video detector array module generating two or more transmission metrics of a received video signal for a predetermined amount of time; and a state machine in signal communication with the video detector away module and detecting a transmission format of the received video signal based on the generated metrics;

wherein the video detector array module includes a video line detector and a sub-carrier frequency detection module, wherein the video detector array module further includes a sub-carrier alternating phase detector, and wherein the video detector array module further includes one of a black detector, a user programmable NTSC selector, or a user programmable PAL selector.

* * * * *